United States Patent [19]

Elsner

[11] Patent Number: 4,680,986
[45] Date of Patent: Jul. 21, 1987

[54] DRIVE UNIT, PARTICULARLY FOR SHORT-HAUL VEHICLES

[75] Inventor: Ernst Elsner, Herbrechtingen, Fed. Rep. of Germany

[73] Assignee: J.M. Voith GmbH, Fed. Rep. of Germany

[21] Appl. No.: 822,413

[22] PCT Filed: Apr. 2, 1985

[86] PCT No.: PCT/EP85/00148

§ 371 Date: Dec. 31, 1985

§ 102(e) Date: Dec. 31, 1985

[87] PCT Pub. No.: WO85/05600

PCT Pub. Date: Dec. 19, 1985

[30] Foreign Application Priority Data

May 29, 1984 [DE] Fed. Rep. of Germany ....... 3419958

[51] Int. Cl.⁴ .................. B60K 41/28; B60K 9/04
[52] U.S. Cl. ..................................... 74/866; 74/572;
74/661; 74/731; 180/165
[58] Field of Search ................. 180/165; 74/572, 661,
74/665 B, 675, 731, 752 A, 752 D, 861, 865,
866; 192/0.09, 3.51

[56] References Cited

U.S. PATENT DOCUMENTS

| | | | |
|---|---|---|---|
| 2,935,899 | 5/1960 | Nallinger | 74/730 |
| 3,503,281 | 3/1970 | Gsching et al. | 74/675 |
| 3,665,788 | 5/1972 | Nyman | 74/572 X |
| 3,886,810 | 6/1975 | Sugiyama et al. | 180/165 X |
| 4,073,139 | 2/1978 | Armasow et al. | 60/357 |
| 4,126,200 | 11/1978 | Miller et al. | 180/165 |
| 4,171,029 | 10/1979 | Beale | 180/54 R |
| 4,342,371 | 8/1982 | Smitley | 180/165 |
| 4,388,977 | 6/1983 | Bader | 180/165 |
| 4,495,836 | 1/1985 | Cohen | 74/572 X |

FOREIGN PATENT DOCUMENTS

| | | |
|---|---|---|
| 1064354 | 8/1959 | Fed. Rep. of Germany . |
| 3013024 | 10/1981 | Fed. Rep. of Germany ...... 180/165 |
| 8234210.5 | 12/1983 | Fed. Rep. of Germany . |
| 2528769 | 12/1983 | France . |
| 1025536 | 6/1983 | U.S.S.R. ........................... 180/165 |

Primary Examiner—Rodney H. Bonck
Assistant Examiner—Richard M. Lorence
Attorney, Agent, or Firm—Ostrolenk, Faber, Gerb & Soffen

[57] ABSTRACT

A drive unit for a vehicle comprises an engine for driving a gear-shift transmission through an input shaft. The input shaft is also coupled via a gear assembly and a hydrodynamic coupling to a flywheel accumulator. During acceleration of the vehicle, kinetic energy stored in the flywheel flows to the input shaft of the transmission. When braking takes place, energy from the input shaft flows to the flywheel accumulator. The torque transmitted by the hydrodynamic coupling is adjustable. As the coupling slippage approaches a boundary of a slippage region in the coupling, a control device effects a switching of the gear-shift transmission whereby readjustment of the coupling slippage is achieved. Furthermore, the control device controls the gear-shift transmission—on the basis of whether "acceleration" or "braking" is demanded—such that the speed of rotation of a first coupling half in the coupling, as viewed from the direction of energy flow, is greater than the speed of rotation of another coupling half.

22 Claims, 3 Drawing Figures

DRIVE UNIT, PARTICULARLY FOR SHORT-HAUL VEHICLES

BACKGROUND OF THE INVENTION

The present invention relates to a drive unit system including a flywheel which assists braking by storing energy during braking and from which energy is recovered at all other times. The drive unit system includes a drive engine, a gear shift transmission, and a flywheel accumulator. The flywheel accumulator helps accelerate a vehicle, as it is discharged, i.e. giving off rotational energy. Furthermore, the flywheel accumulator is used to brake the vehicle, whereby it is charged, i.e. takes up rotational energy. The braking energy is thus usefully recovered. Such drive units are intended, in particular, for city buses but are also suitable for short-haul rail vehicles.

PRIOR ART

1. Article: "Infinitely Variable Transmission for the Daimler-Benz Gyrobus" by S. Hainmuller
2. Federal Republic of Germany Pat. No. 629 771
3. Federal Republic of Germany Pat. No. 30 13 024
4. Federal Republic of Germany Pat. No. 26 14 476 (corresponding to U.S. Pat. No. 4,073,139)

The invention is an improvement on one of the drive units which have become known from Reference 1. The closest prior embodiment is the embodiment designated B1 in FIG. 2. For an infinitely variable speed converter there is used in Reference 1 a hydrostatic transmission having means for the continuous variation of the transmission ratio. Each charging or discharging of the flywheel accumulator requires a continuous variation of the transmission ratio. The speed or force of variation selected (together with other factors) determines the rate of acceleration or deceleration of the vehicle.

Infinitely variable hydrostatic transmissions always had the inherent disadvantage of being relatively heavy, of complicated construction and subject to wear. As a rule, they also produce disturbing noises. In known drive units, the hydrostatic transmission is connected to the output shaft via a multi-step shift transmission. Due to the foregoing observation and to the control arrangement which requires that whenever the transmission ratio of a speed converter approaches a transmission range limit a control device must change the transmission ratio of the speed converter to maintain it within a given range certain problems are encountered. For example, upon acceleration and braking, when the flywheel is, respectively, charged and discharged the most efficient operating points of the hydrostatic transmission are passed through several times, one after another. This approach, which in principle is very favorable, sets high standards for the device used for setting the transmission ratio in the hydrostatic transmission. The result is that whenever a shifting of the gearshift transmission is necessary when the transmission ratio approaches one of the limits of the transmission range, a precise change in the transmission ratio of the hydrostatic transmission which corresponds to the step-wise jump in the gear-shift transmission must also take place within a very short time. Otherwise, expensive hydroaccumulators and the corresponding auxiliary devices are necessary.

SUMMARY OF THE INVENTION

It is an object of the present invention to provide a drive unit which dispenses with a hydrostatic transmission. This enables transmission operation, as free of wear and noise as possible. Furthermore, it is an object of the invention to enable use of the invention with existing, mass-produced transmissions.

It is known from the literature (Reference 2) to use a hydrodynamic coupling for the charging and discharging of a flywheel accumulator; see, for instance, the coupling K with variable degree of filling in FIG. 5 of Reference 2. One disadvantage of this arrangement is that during a full charging or discharging process (i.e. upon passage through the entire speed range of the flywheel accumulator) the transmission range of the coupling—and thus also the range of good efficiency—is passed through only once. Therefore, the hydrodynamic coupling suffers from high conversion losses over large parts of its operating range. Furthermore, the hydrodynamic coupling must be very large to be able to produce the high torque required at the lower end of the range of travel speeds.

To avoid the above disadvantage another known drive unit (Reference 3) uses two hydrodynamic couplings, namely a charging coupling and a discharge coupling. The operating range and the size of the discharge coupling are kept relatively small by two measures. On one hand, the discharge process is placed in operation only above a given minimum speed of rotation of the output shaft (about 50% of the maximum speed of rotation of the output shaft). In other cases the shift transmission is a purely hydrodynamic transmission in which the transmission of the torque (within the entire range of travel speed) always takes place via a torque converter.

Thus, the transfer of the energy of rotation taken from the flywheel accumulator also takes place in succession over the discharge coupling and a hydrodynamic torque converter. The latter effects the predominant part of the necessary infinitely variable conversion of the speed ratio between the flywheel accumulator and the output shaft and at the same time increases torque. One disadvantage of the last construction is that hydrodynamic torque converters are, by their nature, incapable of transmitting braking moment from the output shaft to the flywheel accumulator. Therefore, also needed is the aforementioned charge coupling which connects the output shaft via gearwheels (by-passing the hydrodynamic converters) to the flywheel accumulator. The full expense is justified only if the hydrodynamic transmission is independently present, as for instance in the case of rail vehicles.

The drive unit of the present invention—in contrast to Reference 3—only a single slippable coupling is needed (preferably a hydrodynamic coupling). Nevertheless, good average efficiency is obtained because the invention uses the concept of Reference 1 of arranging a step-shift transmission between the speed converter, i.e. now the slip coupling, and the driven shaft. Thus a relatively small slip coupling is required and the range of good efficiency is passed through several times during each full charging or discharging cycle of the flywheel accumulator. The control device can bring about shifting of the gearshift transmission at a much lesser expense than that of the drive unit of Reference 1, particularly when the coupling has reached one of the limits of its transmission range. (The limits of the transmission range of the coupling are its largest and smallest slip values). If, for instance, the smallest slip value is reached, then a sudden increase in the slip can be readily imposed (by shifting the step-shift transmission) upon the slip coupling. In the case of a hydrodynamic coupling there is the possibility, that a sudden increase in the torque converted will result from a sudden increase in slip. However, this danger can be eliminated simply by known means (for instance, Reference 4) for the automatic rapid emptying of the coupling.

Another essential step for assuming the usefulness of the slip coupling provided in accordance with the invention requires the following: The control device is so constructed that upon each initiation of a traction operation (or upon entry into a braking operation) the speed of the coupling half which is situated first in the path of the direction of flow of the force is adjusted, by selection of a suitable transmission ratio, to an amount which is greater than the speed of the other half of the coupling. In this way, a discharge process can be introduced at any time within the speed range of the flywheel accumulator, and at any time.

BRIEF DESCRIPTION OF THE DRAWINGS

Embodiments of the invention and further advantageous developments will be described below with reference to the drawing, in which.

DETAILED DESCRIPTION OF THE PREFERRED EMBODIMENT

Figure 1:
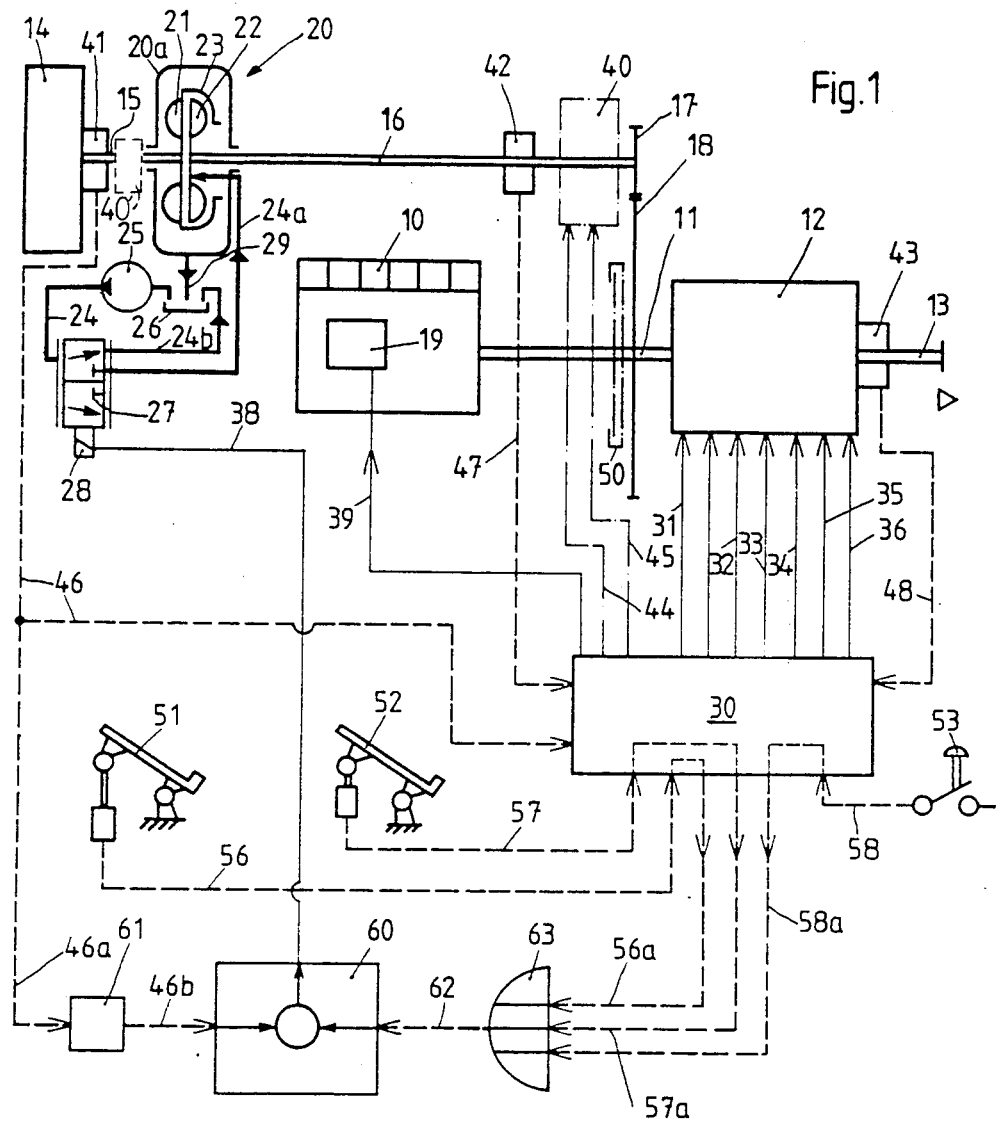
FIG. 1 shows diagrammatically a drive unit according to the invention.

Referring to FIG. 1, an internal combustion engine 10 drives input shaft 11 of a load shift transmission 12, for instance a six-gear transmission, which has an output shaft 13. A flywheel 14 is fastened to shaft 15 to which is also connected one vane wheel 21 of a hydrodynamic coupling 20. Another vane wheel 22 is connected via shaft 16 to pinion 17. The latter meshes with a gearwheel 18 which is connected to input shaft 11. A shell 23 rotates together with vane wheel 21.

A filling line 24/24a for feeding an operating fluid, discharges into coupling 20. The fluid is removed by pump 25 from fluid container 26 and is supplied through quantity control valve 27. Valve 27 is controllable by means, for instance, of an electric setting device 28. The valve can be a flow-divider valve, as shown symbolically. In this case, the stream of fluid fed via line 24 passes in part via line 24a into the coupling 20 and in part via the line 24b back into the container 26, the quantitative ratio between the individual streams being adjustable as desired.

Coupling shell 23 has a plurality of continuously open, throttled discharge openings (not shown in the drawing). A certain amount of operating fluid can escape from them continuously from the inside of the coupling, either directly into the fluid container 26 or into a stationary coupling housing 20a. In this case there is connected to housing 20a a discharge line 29 which discharges into the fluid container 26. Elements 24 to 29 serve for changing the degree to which hydrodynamic coupling 20 is filled. The filling level, as is known, determines the torque transmitted for a given speed ratio (slip). A coupling similar to Reference 4 is preferably used. This known coupling can limit the coupling moment by automatic discharge through an additional discharge opening. This is important, particularly during braking, i.e. upon the charging of the flywheel 14, when the load-shift transmission 12 is shifted from one gear to the next. Therefore, in accordance with the teaching of Reference 4, shell 23 is fastened to vane wheel 21 which is coupled via shaft 15 to flywheel accumulator 14.

The engine 10 comprises load adjuster 19 (for instance at the injection pump in the case of a diesel engine. A control center 30 is connected via control lines 31 to 36 to load-shift transmission 12. The control center can select one of the six gears in the load-shift transmission or shift the load-shift transmission to neutral. Another control line 39 extends to load adjuster 19 of engine 10. On shafts 15, 16 and 13 are disposed tachometers 41, 42 and 43 respectively, from which measurement lines 46, 47 and 48 respectively lead into control center 30. By means of gas pedal 51 and brake pedal 52 the driver transmits, via control lines 56 and 57, respectively, the desired levels of acceleration or deceleration to control center 30. Furthermore, switch 53 is provided for commanding charging of flywheel accumulator 14 by means of engine 10.

A controller 60 serves for adjusting the torque transmitted by coupling 20. To this end, line 46a branches off from measurement line 46 and is connected to an input of differentiation device 61. The output of device 61 supplies a measurement signal which corresponds to the instantaneous acceleration or deceleration in speed of rotation of flywheel accumulator 14. This measurement signal is fed via line 46b as actual value to controller 60. The actual value corresponds, with a high degree of precision, to the instantaneous torque being transmitted by coupling 20. Controller 60 compares this actual value to the desired value which is fed via line 62 connected to the output of OR member 63.

The input side of OR member 63 is connected to three lines 56a, 57a and 58a coming from control center 30. Control center 30 supplies, via line 56a, a value which corresponds to the desired acceleration supplied by gas pedal 51 and, via line 57a, another value which corresponds to the desired deceleration established by brake pedal 52. The last desired value which is supplied via line 58a is set to a fixed level in control center 30 and is only effective when charging of the flywheel accumulator by the engine has been selected. When controller 60 notes that the compared values (actual value versus desired value) differ from each other, it displaces valve 27 via line 38 and in this manner a change in the filling level of coupling 20 is established so that the coupling moment is set to the desired value called for at the time.

Figure 2:
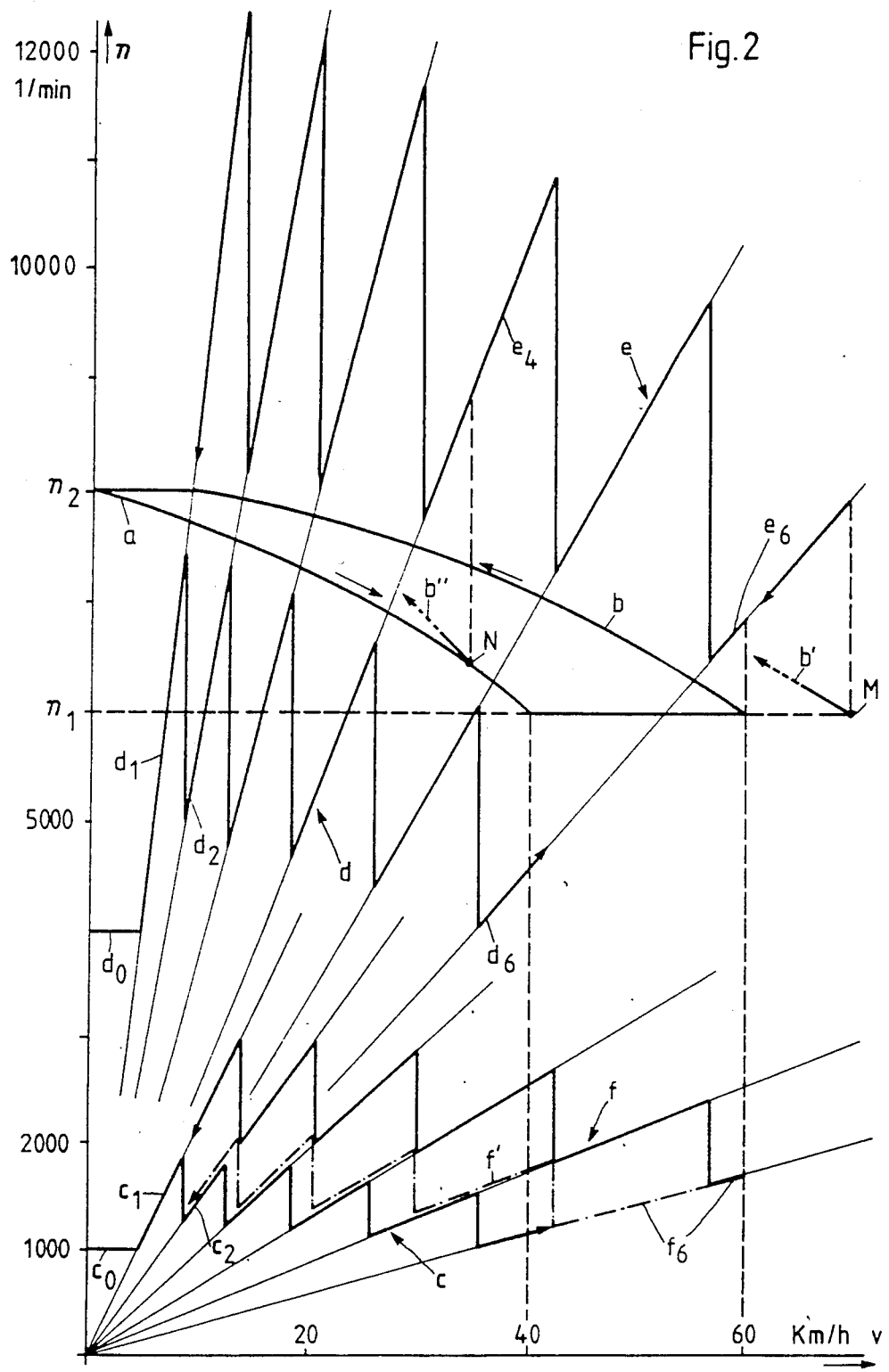
FIG. 2 is a diagram corresponding to FIG. 1 in which the speeds of rotation n of the essential parts of the unit are plotted over the speed of travel v.

FIG. 2 shows a curve a of the reduction of the flywheel speed during the acceleration of the vehicle, for instance between 0 and 40 km per hour. Beyond this range (40 km per hour) the speed of the flywheel remains approximately constant, at a minimum value $n_1$. A curve b shows the increase in speed of the flywheel during a braking process, for instance from a speed of 60 to about 10 km/hr. Below 10 km/hr braking is effected entirely mechanically and the speed of the flywheel does not exceed an approximate maximum value of $n_2$. Zigzag line c shows the variations in the speed of the engine (speed of input shaft 11) during an accelerating of the vehicle, taking into account the different transmission ratios produced by transmission 12. The corresponding speed of rotation of shaft 16 (zigzag line d) is, for instance, four times the engine speed and is determined by the transmission ratio of step-up gearwheels 18, 17. The speeds of rotation of shaft 16 during braking (charging of flywheel accumulator 14) are shown by zigzag line e. The corresponding speed profile of input shaft 11, reduced by the transmission ratio of step-up gears 17, 18, is represented by zigzag line f.

CHARGING OF THE FLYWHEEL ACCUMULATOR 14 WITH THE VEHICLE STATIONARY

As mentioned, before starting the vehicle, the flywheel accumulator 14 is charged by means of engine 10, under control of switch 53 (FIG. 1). Control center 30 maintains the load shift transmission 12 at neutral, adjusts engine 10 to full load and feeds a desired value to controller 60 via lines 58a and 62. In this way, controller 60 brings about partial filling of coupling 20 so that speeding-up of the flywheel accumulator commences. With increasing speed of rotation of the flywheel the coupling slippage decreases. In order for the torque transmitted by the coupling to nevertheless remain at least approximately constant, controller 60 gradually increases the degree of filling of the coupling. When the maximum speed of rotation of the flywheel is reached, the control center places engine 10 at idle, sets the desired value in line 58a to zero so that controller 60 brings about a discharge of coupling 20.

STARTING

The command to start is given by gas pedal 51 to control center 30. The latter, via line 31, shifts transmission 12 into first gear and via lines 56a and 62 supplies to controller 60 a desired value which corresponds to the position of the gas pedal. The controller in turn effects a partial filling of coupling 20 via line 38 by controlling the degree of filling of the coupling as a function of the indicated acceleration. In general, the speed of shaft 16 is held at that value which corresponds to the idling speed of engine 10 (horizontal lines $d_o$ and $c_o$ in FIG. 2) until synchronous operation of the first gear of shift transmission 12 is reached. Alternately, however, an increase in these speeds of rotation due to a stronger increase in the degree of filling of the coupling can also take place already during the synchronization of the first gear.

FURTHER ACCELERATION

After reaching the synchronous operation of the first gear in transmission 12, the amount of the acceleration of the vehicle is further determined by the position of gas pedal 51. The controller 60 accordingly controls the increase in the fluid level in the coupling. The filling of the coupling is increased by the driver (or by control center 30) only as required, for instance as when increased vehicle motion resistance is encountered. The speeds of rotation of shafts 11 and 16 now increase along diagonals $c_1$ and $d_1$ respectively associated with the first gear. The flywheel speed of rotation decreases, as already mentioned, along curve a. When the two speed values a and $d_1$ have substantially approached each other, for instance upon slippage in the coupling 20 of still only about 3% (minimum slippage), control center 30 shifts transmission 12 into second gear. In this way the speeds of rotation of the shafts 11 and 16 drop along approximately vertical lines to the diagonal $c_2$ and $d_2$ respectively of the second gear. The controller 60 at the same time brings about a decrease in the degree of filling in the coupling 20 in such a manner that the coupling moment, despite the sudden increase in slippage, corresponds as previously to the position of the gas pedal (i.e. the desired acceleration). There is again an increase in the speeds of rotation of the shafts 16 and 11 as during operation in the first gear. The above-described cycle is repeated until finally the sixth gear is connected or until the speed of rotation of the flywheel has reached its smallest possible value $n_1$. The latter may under certain circumstances take place at a gear lower than the sixth gear.

DRIVE BY THE ENGINE ALONE

If during acceleration the speed of the flywheel has dropped to the value $n_1$ before the sixth gear was reached or if, in sixth gear, the coupling 20 has again reached the minimum slippage, then further discharging of the flywheel accumulator 14 is no longer permitted. Control center 30 now sets the desired value in line 56a to zero so that controller 60 discharges coupling 20. If further acceleration is demanded, control center 30 controls the engine accordingly so that the vehicle is accelerated solely by engine 10 or a constant speed of travel is maintained. The speed of the flywheel remains approximately constant (aside from a reduction in the speed of rotation as a result of the minor losses that occur normally). The speed of shaft 16 now increases to values above the speed of rotation of the flywheel, along diagonal $d_6$ of the sixth gear.

BRAKING

If braking is demanded, for instance, at a vehicle travel speed of 60 km/hr, control center 30 supplies a value representative of the desired deceleration set by brake lever 22. That value is referred to as the desired value which is supplied via lines 57a and 62 to controller 60. The latter again brings about the filling of the coupling so that the flywheel accumulator 14 is charged by the kinetic energy of the vehicle. The degree of filling of the coupling is again continuously increased by controller 60. The controller controls the increase in the degree of filling in such a manner that acceleration of flywheel 14 produces a desired braking moment.

With sixth gear connected, the speed of rotation of shaft 16 drops along the diagonal $e_6$ until the coupling slippage has again reached the minimum value. Transmission 12 then shifts into fifth gear causing the speeds of rotation of shafts 11 and 16 to rise along approximately vertical lines. In this case controller 60 reduces the degree of filling in the coupling bringing about an increase in the slippage and the cycle begins all over again. The charging of flywheel accumulator 14 (and the braking of the vehicle resulting therefrom) is at an end when, with first gear connected, the minimum slippage in the coupling 20 is reached. At this operational point, control center 30 sets the desired value in line 57a to zero and consequently controller 60 empties coupling 20. The vehicle is now brought to a stop, if desired, entirely by means of the friction brakes.

As illustrated in FIG. 2, it is assumed that constant acceleration or deceleration is demanded. Therefore, curves a and b are continuous curvatures. It should be understood that other shapes of such curves are also possible. For instance, this is true when brake pedal 52 is moved during braking. Naturally, the shape of the curves also depends on the size and quantity of flywheel mass in flywheel accumulator 14.

It is also obvious that charging of accumulator 14 (braking) can be commenced at numerous desired speeds of travel, for instance at maximum speed, in which case the brake curve b' representing the increase in the speed of rotation of the flywheel commences at point M. In exactly the same manner, a braking process can be introduced directly after an accelerating process, for instance even before the flywheel has reached its minimum speed of rotation $n_1$. See, for instance, the starting point of the braking curve b" at point N. In this case, control device 30 switches transmission 12 at the beginning of the braking process directly into fourth gear, so that the speed of rotation of shaft 16 (diagonal $e_4$) is kept greater than the speed of rotation of the flywheel.

In the embodiment described thus far, relatively high speeds of rotation in engine 10 and shaft 11 result upon braking (i.e. upon charging of the accumulator), as is shown by the zigzag line f. To protect engine 10 from such high rotational speeds, a clutch 50 or freewheel can be arranged between engine 10 and gear 18. In this manner, the engine can be disconnected during a braking operation, and fuel consumption and dragging losses are also reduced. Furthermore, if necessary, it is possible to start up with the flywheel alone and without the engine. In other words, the engine, if desired, will be connected again when the vehicle has left its station. In this case, the transmission 12 need not have (as assumed above) a slippable first gear, for instance with a torque converter. Instead, coupling 20 assumes the additional function of serving as a starting transmission member or gear in that it speeds up the entire unit including the shafts 11 and 16 from the stopped position.

Conversely, however, it can also be arranged that starting is effected solely with engine 10, particularly if—as already mentioned—the load shift transmission 12 has a starting transmission member (converter, slippable coupling or the like).

Instead of or in addition to clutch 50, an additional two-gear shift transmission 40 can be provided between coupling 20 and transmission 12, which transmission 40 will be controlled by control center 30 via lines 44 and 45. In FIG. 1 it is assumed that the step-up gear gearwheels 17, 18 (which produce a transmission ratio of for instance 1:4 between shafts 11 and 16) remain. In this case one gear (a direct gear) can have a transmission ratio of 1:1 and the other gear (fast gear) a ratio of 1:1.5 in the additional transmission 40 so that an overall transmission ratio of 1:6 is obtained. The same effect can, however, also be obtained by combining the step-up gear 17/18 and the two-gear transmission 40 into a single transmission (two-stage step-up gear transmission).

ACTION OF THE TWO-GEAR SHIFT TRANSMISSION 40

During acceleration, transmission 40 is in direct drive (transmission ratio 1:1) so that there is no difference from what has been set forth above. Now let us assume that a braking process starts again (as in the section "Braking" above) at a velocity of 60 km/hr and that the minimum flywheel speed of rotation is $n_1$. The additional transmission 40 is at first in direct drive, so that the speed of rotation of shaft 16 (as above) decreases along diagonal $e_6$ and the speed of rotation of shaft 11 proceeds along diagonal $f_6$. If the coupling slippage has again reached the minimum value (at about 57 km/hr) then instead of transmission 12, additional transmission 40 will be switched into the above-mentioned fast gear. It is assumed that the gear progression in the additional transmission 40 is the same as that in the load shift transmission 12. Accordingly, the speed of rotation of shaft 16 now changes in exactly the same way along the zigzag line as in the example without supplementary transmission. The speed of rotation of the shaft 11 is still reduced, on the other hand, along diagonal $f_6$. Only when clutch slippage has reached the minimum value for the second time (at about 42 km/hr) is the load shift transmission 12 shifted from the sixth gear into the fifth gear; the additional transmission 40 remains in fast gear. Accordingly, the braking process proceeds in exactly the same way as in the first example. It can be seen, however, that the speed of rotation of shaft 11 is now along a much lower speed as shown by zigzag line f' (dash-dot line). These lower speeds or rotation are generally within the permissible ranges for all ordinary engines and are more favorable for load shift transmission 12 since less losses and noise are engendered. Another advantage is that in the lower speed of travel range an additional gear is available upon both the discharging and the charging of the accumulator 14 (not shown in FIG. 2).

Departing from the arrangement of FIG. 1, the additional shift transmission 40 can be arranged between coupling 20 and the flywheel 14. This is indicated with the dotted box 40' which indicates the variation of locating the additional shift transmission in the indicated location. Other possibilities are available in that shafts 11 and 16 can be connected by an angular gear and to this extent arranged not parallel but at a given angle to each other or in the manner that flywheel 14, coupling 20 and the high-speed transmission are arranged coaxially to shaft 11.

Figure 3:
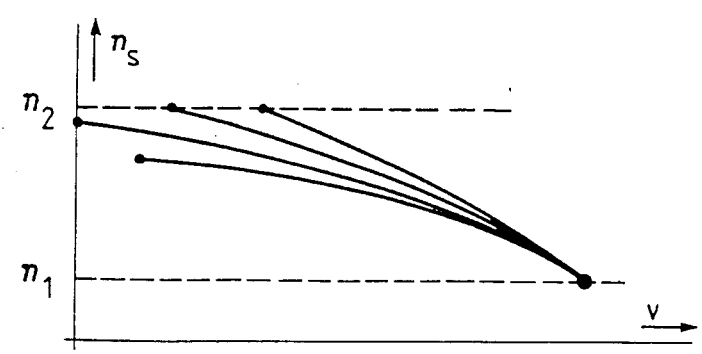
FIG. 3 is a diagram containing different flywheel/rotary speed curves.

FIG. 3 shows an important further embodiment of the invention. Here are shown several different curves which correspond to curve a on FIG. 2 to indicate the decrease in the speed of rotation $n_s$ of the flywheel upon accelerating of the vehicle. It is essential that all of these curves reach the minimum flywheel speed of rotation $n_1$ at a given speed of travel (for instance, 60 km/hr) which lies slightly below the maximum speed. In other words, they all intersect at a fixed endpoint regardless of the starting point at which the acceleration commences. This is obtained in that the control center 30 varies the desired value which it supplies to line 56$a$ in accordance with different functions upon an increase in the speed of travel v. The specific function used depends on the starting point.

It is a prerequisite here that during acceleration the flywheel always operates together with the engine. If the delay in the rotation of the flywheel which is thus controlled is too small in order to provide the vehicle acceleration commanded by the gas pedal 51 then the control center 30 increases the filling of the engine 10 so that the latter produces the missing moment of acceleration.

By such a control, it is assured that during all accelerating processes the flywheel can also be used over practically the entire range of travel speeds. In other words, engine and flywheel are more uniformly loaded than in the example first described, in which the flywheel frequently reaches the minimum speed of rotation already at about half the speed of travel so that the engine alone must supply the further acceleration.

The advantage of the above-described control approach is that a smaller engine can be used and that the shifting to engine operation alone takes place much more infrequently and at a relatively high speed of travel. Potential abrupt shifting is thus rarer and more pleasant operation is provided.

In accordance with FIG. 1, coupling 20 has only a single toroidal-shaped working space. In this connection it is assumed that the coupling 20 has paraxial vanes so that it can transmit the same high power in both directions force flow. In the alternative, a double coupling having two working chambers and oblique vanes can, if necessary, be provided (corresponding to German Provisional Pat. No. AS 16 00 191 which is equivalent to U.S. Pat. No. 3,481,148). In this way, the power transmission capability is substantially increased.

Another variant to FIG. 1 is obtained from the following arrangement. Between flywheel 14 and transmission input shaft 11 there are arranged two drive lines which are parallel to each other and coupled to each other in the region of shaft 11 by a high-speed gear assembly which produces a speed-of-rotation ratio of, for instance, 1:1.5 (corresponding approximately to the progression in steps of the shift transmission 12) between the two drive lines. There is then provided, in each drive line, a hydrodynamic coupling having only a single working chamber, with vanes obliquely arranged in such a manner that the full power can be transmitted over the one coupling upon the charging of the accumulator and over the other coupling upon the discharging of the accumulator. In this way it is unnecessary for the high-speed transmission to have two shiftable gears (as in the case of the transmission 40 in FIG. 1). Instead of this, shifting is effected from direct drive into high speed (or conversely) simply and solely by emptying one coupling and simultaneously filling the other.

I claim:

1. A drive unit for a vehicle, comprising:
   an input shaft intended to be driven by an engine, an output shaft and a transmission disposed between the input shaft and the output shaft and effective for setting a transmission ratio therebetween, the input shaft coupling the engine and the transmission to one another and the output shaft being effective for applying rotational energy from the transmission to the vehicle;
   a flywheel accumulator;
   a slippable coupling for coupling the input shaft and the flywheel accumulator to one another, the slippable coupling comprising a first coupling half and a second coupling half and having a speed ratio which is infinitely adjustable within a speed ratio range extending between a lower and an upper limit;
   the drive unit being of the type which permits rotational energy to flow from the flywheel accumulator to the output shaft when the vehicle is in an acceleration mode and from the output shaft to the flywheel accumulator when the vehicle is in a braking mode; and
   a control device for controlling the transmission such that whenever the slippable coupling approaches one of its speed ratio limits, the transmission ratio is adjusted such that the speed ratio of the coupling remains within its speed ratio range; the control device further comprising means for controlling the transmission such that the speed of rotation of that coupling half of the first and second coupling halves which is situated first in the direction of energy flow rotates at a greater speed than the other of the two coupling halves which is located downstream along the energy flow direction.

2. A drive unit according to claim 1, in which the transmission includes a gear change box having a plurality of gears and in which the control device is effective for selecting any one of the gears in order to set the transmission ratio.

3. A drive unit according to claim 2, further comprising:
   a controller;
   means for inputting to the controller an instantaneous acceleration or deceleration value of the flywheel accumulator;
   means for inputting a desired level of acceleration or deceleration; and
   means in the controller for actuating a setting device which controls the torque transmitted by the slippable coupling such that the instantaneous acceleration or deceleration value of the flywheel accumulator will become matched to the desired level of acceleration or deceleration.

4. A drive unit according to claim 3, wherein the desired acceleration level is set by a gas pedal.

5. A drive unit according to claim 3, wherein the desired deceleration level is set by a brake pedal.

6. A drive unit according to claim 1, further comprising a separating device operable for disconnecting the engine from the transmission during at least a portion of the braking mode.

7. A drive unit according to claim 6, wherein the separating device is further operable for disconnecting the engine from the transmission during a starting mode of the vehicle.

8. A drive unit according to claim 6 or 7 wherein the separating device comprises a clutch.

9. A drive unit according to claim 6 or 7, wherein the separating device comprises a free wheel.

10. A drive unit according to claim 1, further comprising means for disengaging the slippable coupling when the rotational speed of the flywheel accumulator has reached a minimum speed of rotation during an acceleration mode or has reached a maximum speed of rotation during a braking mode.

11. A drive unit according to claim 10, wherein the control device includes means for speeding up the engine in conjunction with the disengaging of the coupling.

12. A drive unit according to claim 10, wherein the control device includes means for actuating a braking device in conjunction with the disengaging of the coupling.

13. A drive unit according to claim 1, further comprising an auxiliary transmission located between the slippable coupling and the input shaft.

14. A drive unit according to claim 13, wherein the auxiliary transmission comprises a two-gear transmission.

15. A drive unit according to claim 1, further comprising an auxiliary transmission located between the slippable coupling and the flywheel accumulator.

16. A drive unit according to claim 1, wherein the engine is an internal combustion engine.

17. A drive unit according to claim 1, wherein the transmission is a gear-shaft transmission and in which a gear train between the input shaft and the slippable coupling comprises a step-up gear assembly.

18. A drive unit according to claim 1, wherein the slippable coupling is a hydrodynamic coupling.

19. A drive unit according to claim 1, further comprising a switch coupled to the control device for causing energy to be delivered from the engine to the flywheel accumulator when the vehicle is in a neutral gear.

20. A drive unit according to claim 1, further including means for controlling the speed of rotation imparted from the transmission to the engine during a braking mode to remain below a predetermined maximum value.

21. A method for controlling a speed ratio in a slippable coupling having a speed ratio range extending between a lower and upper limit, the slippable coupling being disposed between a flywheel accumulator and an input shaft of a transmission, the method including the steps of:

monitoring the rotational speed ratio of the coupling and, when the speed ratio of the coupling is reaching one of its limits, adjusting a transmission ratio in the transmission such that the rotational speed ratio in the coupling is maintained within the rotational speed ratio range.

22. A method as in claim 21, further comprising the step of disengaging the slippable coupling when the rotational speed of the flywheel accumulator has reached a minimum speed of rotation during an acceleration mode or has reached a maximum speed of rotation during a braking mode.

* * * * *